United States Patent
Harrick

[11] 4,070,111
[45] Jan. 24, 1978

[54] RAPID SCAN SPECTROPHOTOMETER

[76] Inventor: Nicolas James Harrick, Croton Dam Road, Ossining, N.Y. 10562

[21] Appl. No.: 694,496

[22] Filed: June 10, 1976

[51] Int. Cl.² .............................. G01J 3/42; G01J 3/12
[52] U.S. Cl. .............................. 356/83; 350/6; 356/84; 356/97; 356/100
[58] Field of Search .............. 356/96, 97, 99, 100, 356/83, 84

[56] References Cited
U.S. PATENT DOCUMENTS 3,216,313  11/1965  Chishold .......................... 356/100
3,385,160  5/1968  Dawson et al. .................... 356/96
3,632,212  1/1972  Bernal ............................ 356/45

Primary Examiner—Vincent P. McGraw

[57] ABSTRACT

A spectrophotometer capable of rapid spectral scanning is achieved by mounting a low inertia reflective grating directly on the output shaft of a galvanometer type optical scanner, and sweeping the dispersed beam reflected from the grating across a spherical mirror and after reflection therefrom across a beam exit slit. Rapid wavelength switching for a laser spectrometer is also described.

4 Claims, 3 Drawing Figures

RAPID SCAN SPECTROPHOTOMETER

This invention relates to spectrometers. In particular, it relates to a novel optical wavelength scanner which affords improvements in rapid scan spectrophotometers and tunable laser spectrometers.

Rapid scan spectrophotometers and their uses as analytical instruments are known (see, for example, Analytical Chemistry, 41, 481-484 [1969]; 47, 1050-1054 [1975], whose contents are herein incorporated), and are commercially available from companies such as Harrick Scientific Corp., Ossining, New York, Model RSS-B. An instrument capable of a wide range of spectral scan rates from minutes per spectrum up to 1000 spectra/sec ($10^5$ nm/sec) is achieved by driving electromagnetically a small mirror, a so-called optical scanner or galvanometer mirror. In the commercial system, the galvanometer mirror is imaged on a grating on a fixed massive substrate by means of spherical mirror, and then the beam is swept across the width of the spherical mirror by actuating the galvanometer to cause the mirror to pivot or vibrate or oscillate over a small angle. The image of the vibrating mirror remains fixed on the grating, but the angle of incidence of the beam thereon is changed dispersing the beam, which is thus swept across an exit slit causing the wavelength of the exiting beam to follow the deflecting mirror path. In this known instrument, frequency of scan, scan width and wavelength region can all be varied continuously enabling use of the instrument for rapid scanning with tape or computer data storage, with cathode ray oscilloscope display, and as a slow scan instrument with pen recorder display or fixed wavelength operation. By changing gratings and detectors, a wide wavelength range from infrared through ultraviolet can be covered. While such instrument operates very satisfactorily, it does have certain drawbacks, such as many optical elements, an optical system whose magnification between the beam entrance and exit slits is fairly well fixed, and limitations on changing the energy throughput without deteriorating other performance characteristics.

A principal object of the invention is an improved optical system for a rapid scan spectrophotometer employing fewer elements and reducing drawbacks of the known instrument.

Another object of the invention is an improved turnable laser spectrometer.

Briefly speaking, these and other objects and advantages of the invention as will appear hereinafter are achieved by providing a small reflective grating on a very thin, lightweight substrate that can be mounted directly on the output shaft of the optical scanner or galvanometer suspension, thus replacing the galvanometer mirror of the known instrument. This permits an optical layout requiring only two essential elements between the entrance and exit slits, namely, the galvanometer suspended grating and a spherical mirror. When the grating is vibrated, the dispersed beam is swept across the spherical mirror and the reflected beam across the exit slit causing the exiting beam wavelength to follow the vibrating grating.

The vibrating grating can also be applied to provide rapid wavelength switching in a laser spectrometer by replacing the back mirror defining the optical cavity with the galvanometer suspended reflective grating. As the grating is vibrated, the resonant wave-length of the cavity is varied causing the output laser beam to vary in wavelength.

Several preferred embodiments of the invention will now be described in greater detail with reference to the accompanying drawings, wherein.

Figure 1:
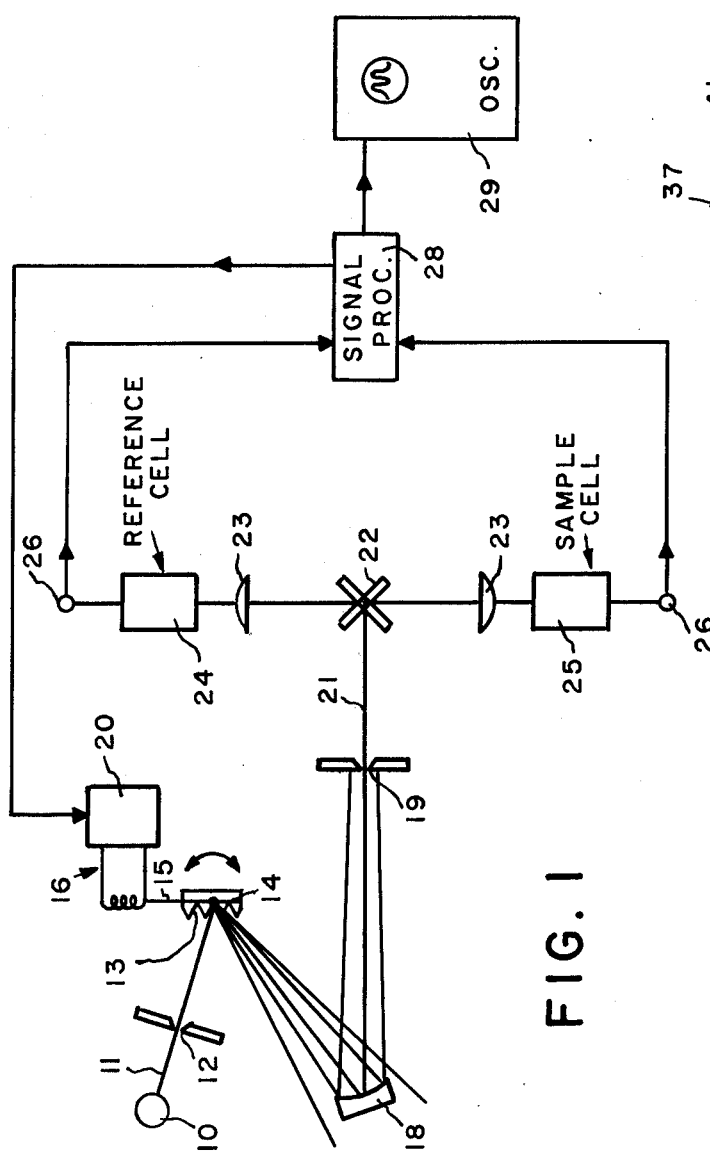
FIG. 1 illustrates the optical layout and some electrical circuitry of one form of rapid scan spectrophotometer in accordance with the invention.

FIG. 1 shows the optical layout and schematic circuitry for one form of rapid scan spectrophotometer embodying the present invention. A conventional light source designated 10 supplies a collimated beam 11 of radiation to a conventional entrance slit 12. The light source 10 can be a xenon source, tungsten-quartz halogen lamp, Nernst glower or like source generating a radiation or light beam covering the desired wavelength band. Not shown are conventional source focussing elements such as a back spherical reflector and collimating lenses, typically of quartz for the ultra-violet and visible range, or of calcium fluoride for infrared. The slit 11 can be adjustable. Located in the path of the light beam 11 is a reflective grating 13 mounted on a thin substrate 14 which is directly mounted on the output shaft 15 of a conventional optical scanner 16, such as for example, a type G-600 manufactured by General Scanning, Inc. of Watertown, MA. The grating 13 disperses the beam and reflects the dispersed beam onto a spherical mirror 18, from which the beam is reflected along a path through an exit slit 19, which can also be adjustable. When the optical scanner is activated by suitable electrical drive circuits 20, the output shaft is vibrated over a short arc (6° for the type G-060). The axis of vibration, designated 21, is located in the plane of the grating, and extends perpendicular to the plane defined by the optical beam paths. The resultant change in the angle of incidence of the beam 11 on the reflective grating 13 sweeps the dispersed beam across the spherical mirror and after reflection therefrom across the exit slit 19; as a result, the beam passing through the exit slit 19, designated 21, varies in wavelength as the grating rotates from one extreme position to the opposite extreme position of its arc. The varying wavelength beam can then be employed in any number of well-known single beam or double beam spectrometer geometries for many analytical purposes. FIG. 1 illustrates one such geometry, a well-known double-beamed arrangement wherein the exiting beam 21 is divided in a beam splitter 22, each beam halve then focussed by lenses 23 to pass, respectively, through a reference cell 24 and a sample cell 25, and the beams transmitted through the cells containing now absorption or transmission information as a function of wavelength of the reference and sample materials, respectively, detected by suitable photomultiplier tubes 26 for ultraviolet or visible, or lead sulphide for infrared. The resultant electrical signals generated by the detectors 26 are coupled to a suitable and well-known signal processing circuits 28 together with a signal derived from the driver circuit for the scanner, and the results conventionally read-out or displayed, such as by an oscilloscope 29, which can be connected to display directly, for instance, an absorbance spectrum of the sample material as a function of the chosen wavelength range. By a suitable choice of light sources, gratings and detectors, the entire wavelength range from ultraviolet-visible-infrared, eg., 200 nm to 3 um, is readily covered.

The scanning speed depends upon the speed with which the grating 13 can be vibrated. The known scanner previously identified is capable of vibration at a frequency of over 3000 Hz when unloaded. The inertia of the added grating reduces the achievable vibration frequency. To achieve rapid scan spectrophotometry, for the many applications where this capability is needed, such as in studies of kinetic reactions, or monitoring or characterizing transient and intermediate products produced during various processes, it is essential to be able to deflect the grating and thus scan through a desired wavelength range within 0.01 seconds or less. The known dispersive gratings prepared on massive substrates have far too much inertia to permit their direct mounting on the scanner shaft and rotation at the speed indicated. This was one of the reasons why in the prior art instruments it was necessary to fix the grating and provide a small low-inertia mirror on the scanner shaft to obtain the desired wavelength scanning.

In the present invention, I have found it possible to obtain small gratings suitable for such instruments on very thin substrates, resulting in a reflective grating with an inertia comparable to that of the standard small mirror that is suitable for direct mounting on these rapid scan galvanometer suspended devices. Such tiny gratings suitable for use in this invention are, typically, about one-quarter inch in diameter, round or square, preferably round, and typically about one-half mm in thickness. A suitable thin substrate is quartz, though other light-weight materials should also be suitable. The grating is preferably formed by state-of-the art replication techniques on the thin substrate, though it could also be ruled. See Optical Spectra, Oct. 1975, pgs. 29-33 for a more detailed description of forming replicated gratings. Known grating suppliers, such as Bausch & Lomb, of Rochester, N.Y., can provide such thin replicated gratings. I have successfully used in a spectrophotometer such replicated gratings on a quartz substrate employing 1200 lines/mm covering the wavelength range of ultraviolet-infrared, with a blaze wavelength of 250 nm. The lines/mm can if desired extend down, for example, to 600 or 300 lines/mm, and the blaze wavelength increased to 600 or 900 nm when the scanned wavelengths are to be shifted toward the infrared. The grating can be mounted by any suitable means on the scanner shaft, such as by gluing with epoxy on a flat on the shaft.

The essential focussing requirements to be satisfied by the optical layout illustrated in FIG. 1 are relatively simple: 1) the entrance slit 12 is imaged or in focus at the exit slit 19, achieved mainly by adjustment of the spherical mirror 18 position; and 2) the entrance slit 12, the exit slit 19, the grooves on the grating 13, and the grating pivot axis 21 are all parallel to one another. The entrance slit 12 is preferably adjusted so that the beam covers the entire grating surface.

A number of advantages are obtained with the rapid scan spectrophotometer of the invention over the prior art instruments. The number of expensive otpical elements is significantly reduced, saving on instrument cost. Moreover, this is especially important in the ultraviolet spectral region where the reflectivity of mirrors is much less and the number of reflections should be minimized. Whereas the prior art instrument had a fairly well fixed optical magnification of 3:1 between the entrance and exit slits, in the instrument of the present invention the magnification between the entrance and exit slits can be set as desired from above 3:1 to below 1:1. This feature increases the flexibility of the instrument and permits optimization of the optics for different applications. In the prior art instruments, to increase the *f*/number or energy throughput, the size of the galvanometer suspended mirror had to be increased, but at the expense of inferior performance, especially at the fast scan rates. In the present invention, energy throughput can be increased by simply moving the galvanometer suspended grating closer to the entrance slit. All the features and advantages of the prior art commercial instrument are retained in the instrument of the present invention. Frequency of scan, scan width and wavelength region can all be varied continuously. Due to the use of an electromagnetic galvanometer type scanner, scanning ates can be readily adjusted between fixed wavelength and over 1000 spectra/sec using standard drive circuits. A compact optical layout results in the invention enabling more ready access to the optical elements for alignment or calibration purposes, and simplifies access to the sampling and reference sections.

Figure 2:
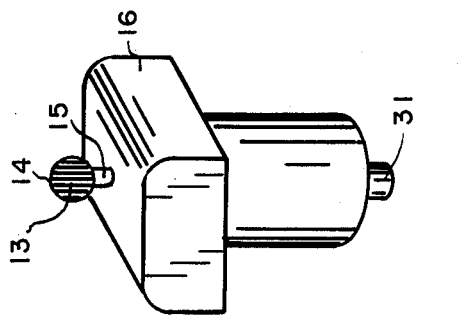
FIG. 2 is a perspective view of a galvanometer suspended reflective grating in accordance with the invention.

FIG. 2 is a perspective view of the G-060 optical scanner 16 described above. It comprises a housing as shown provided at the bottom with a mounting hub 31 for mounting on the optical table with the other optical elements of the system. Projecting up from the top is the output shaft 15 which is vibrated when suitably driven through electrical connections which are not shown. Mounted on the output shaft is the replicated grating 13 on the low-inertia substrate 14. While the grating is illustrated in the various figures by vertical lines in a front view, or sawtooth lines in a side view, in actuality it is understood that to the naked eye it appears simply as a mirror with a rainbow typically displayed thereon.

The rapid wavelength scanner illustrated in FIG. 2 also has a valuable use to provide a tunable laser useful in known spectrometers. As is known, a laser consists of a lasing medium which upon suitable electrical or optical excitation can be caused to lase to generate a highly coherent, collimated light beam.

The laser oscillator comprises an active medium to which pumping radiation is supplied from an external source so that an excess of its atoms are in an upper energy state of two linked energy states whose difference in energy corresponds to the radiation it is desired to generate. The medium is then in the so-called state of population inversion. Such a medium will emit radiation already emitted induces the emission of further radiation, resulting in the radiation and radiation already emitted being intensified. The medium is enclosed in a suitable resonator so that the number of the modes of oscillation of the radiation to be emitted is greatly limited. In simple well-known lasers, the resonator comprises tow parallel flat mirrors between which the medium is positioned so that emitted radiation can travel back and forth in the medium between the mirrors, this radiation being continuously intensified by induced emission of further radiation. The mirror in front is made partly transparent, for example 5%, so that a small fraction of the emitted radiation is transmitted and constitutes the energent beam of radiation, which is a coherent beam.

The mode of laser oscillation or wavelength of the emergent beam depends upon the length of the optical cavity formed by the front and back mirrors, and is usually fixed. Tunable lasers, that is, lasers capable of generating laser beams varying in wavelength, have heretofore been achieved for use in spectroscopy by employing non-linear single crystals through which a fixed mode laser beam is transmitted, and electromagnetically varying the optical properties of the non-linear single crystals to generate various harmonics of the initial laser beam. Since electromagnetic excitation is employed, fast scanning is possible. In the present invention, a fast-scanned tunable laser is achieved by rapidly changing the resonant wave-length of the laser cavity.

Figure 3:
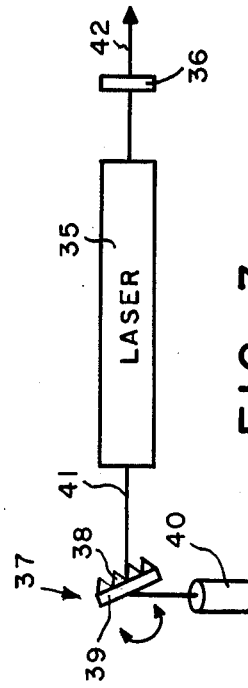
FIG. 3 is a schematic view of one form of tunable laser in accordance with the invention for use in a laser spectrometer.

One embodiment of this aspect of the invention is schematically illustrated in FIG. 3. The laser, usually a gas or dye laser, commercially available, is shown schematically at 35, and combines the lasing medium and pumping means. The optical cavity is defined by a slightly transparent front mirror 36 and a completely reflecting back mirror 37. In accordance with the present invention, the back mirror 37 comprises a reflective grating 38 on a low inertia substrate 39, in turn mounted on a conventional galonometer type scanner 40, all similar to the corresponding elements of FIG. 1. The laser beam within the cavity is designated 41, and the emerget coherent beam 42. When the scanner 40 is activated, the grating 38 vibrates over a small arc, which can be done quite rapidly. Each different position of the grating 38 varies the resonant wave-length of the cavity formed between the mirrors 36 and 37, thereby varying the laser oscillating mode and emergent beam wavelength. Because of the rapid vibration possible with the glavanometer suspended grating, rapid wavelength switching of the laser becomes possible. The application to spectrometers of such apparatus is evident from FIG. 1 and will be obvious to those skilled in this art.

While my invention has been described in connection with specific embodiments thereof, those skilled in the art will recognize that various modifications are possible within the principles enunciated herein and thus the present invention is not to be limited to the specific embodiments disclosed.

What is claimed is:

1. A spectrophotometer capable of rapid wavelength scanning comprising an optical path including a light source and spaced entrance and exit slits, means for imaging the entrance slit on the exit slit, means in the optical path for dispersing the light beam and sweeping the dispersed beam across the exit slit, and means for utilizing the beam emerging from the exit slit, said dispersing and sweeping means comprising a low inertia reflective grating and means for rapidly vibrating the reflective grating over a short arc within a period of 0.01 sec or less, said vibrating means comprising a galvanometer having a vibratable output shaft, the reflective grating being mounted directly on the said output shaft.

2. A spectrophotometer as claimed in claim 1 wherein the reflective grating is approximately one-quarter inch in diameter and one-half millimeter thick.

3. A spectrophotometer as claimed in claim 1 wherein the imaging means comprises a spherical mirror located in the optical path between the reflective grating and the exit slit.

4. A spectrophotometer as claimed in claim 3 wherein the reflective grating and spherical mirror are the only two reflective elements in the optical path between the entrance and exit slits.

* * * * *